(12) United States Patent
Kemshall

(10) Patent No.: US 8,166,299 B2
(45) Date of Patent: Apr. 24, 2012

(54) SECURE MESSAGING

(76) Inventor: Andrew Christopher Kemshall, Basingstoke (GB)

( * ) Notice: Subject to any disclaimer, the term of this patent is extended or adjusted under 35 U.S.C. 154(b) by 1118 days.

(21) Appl. No.: 10/886,152

(22) Filed: Jul. 6, 2004

(65) Prior Publication Data

US 2006/0020799 A1    Jan. 26, 2006

(51) Int. Cl.
*H04L 9/00* (2006.01)
(52) U.S. Cl. ........ 713/170; 713/185; 713/152; 713/150; 713/182; 380/33
(58) Field of Classification Search .................. 713/170
See application file for complete search history.

(56) References Cited

U.S. PATENT DOCUMENTS

| | | | | |
|---|---|---|---|---|
| 5,304,987 | A * | 4/1994 | Brunson et al. | 340/654 |
| 5,311,576 | A * | 5/1994 | Brunson et al. | 379/88.26 |
| 5,329,579 | A * | 7/1994 | Brunson | 379/88.26 |
| 5,552,897 | A * | 9/1996 | Mandelbaum et al. | 358/400 |
| 5,781,614 | A * | 7/1998 | Brunson | 379/88.14 |
| 6,112,078 | A * | 8/2000 | Sormunen et al. | 455/411 |
| 6,636,965 | B1 * | 10/2003 | Beyda et al. | 713/152 |
| 6,993,658 | B1 * | 1/2006 | Engberg et al. | 713/185 |
| 7,031,699 | B1 * | 4/2006 | Andersen | 455/419 |
| 2002/0091734 | A1 * | 7/2002 | Redlich et al. | 707/511 |
| 2002/0178360 | A1 * | 11/2002 | Wenocur et al. | 713/170 |
| 2003/0037261 | A1 * | 2/2003 | Meffert et al. | 713/201 |
| 2003/0055738 | A1 * | 3/2003 | Alie | 705/26 |
| 2005/0138065 | A1 * | 6/2005 | Ciriza | 707/104.1 |
| 2005/0138353 | A1 * | 6/2005 | Spies et al. | 713/153 |
| 2005/0138390 | A1 * | 6/2005 | Adams et al. | 713/185 |
| 2006/0020799 | A1 * | 1/2006 | Kemshall | 713/170 |
| 2006/0117173 | A1 * | 6/2006 | Deblock et al. | 713/150 |

FOREIGN PATENT DOCUMENTS

| | | | |
|---|---|---|---|
| EP | 0785661 A2 | | 7/1997 |
| EP | 1041777 A2 | | 4/2000 |
| JP | 01-276221 | | 9/1994 |
| JP | 06276221 | | 9/1994 |
| JP | 2001-257712 | | 9/2001 |
| JP | 20001257712 | | 9/2001 |
| WO | WO 00/18078 | * | 3/2000 |
| WO | WO 01/18078 | * | 3/2000 |
| WO | WO 0018078 | * | 3/2000 |
| WO | WO 0018078 A1 | * | 3/2000 |
| WO | WO 01/10089 | | 2/2001 |
| WO | WO 01/15402 | | 3/2001 |

OTHER PUBLICATIONS

GB 0217882 Examiners Search Report.

* cited by examiner

*Primary Examiner* — Kambiz Zand
*Assistant Examiner* — Yonas Bayou
(74) *Attorney, Agent, or Firm* — Nixon & Vanderhye PC

(57) ABSTRACT

A messaging method and system sends secure emails (14) by the email originator (10) removing the portion of the email (14) which is confidential (24) from the body of the email (14). The removed portion (24) is sent to a secure storage site (30). The residue (20) of the email (14) is sent to the intended recipient (12), together with a notification (22) that the confidential portion (24) is at the secure site (30). Secure storage site 30 then sends a SMS text message (38) to the recipient's mobile phone (44) which has an authentication code (38) which the recipient (12) uses to establish identity and retrieve the confidential portion (24) of the email message (14) from the secure store (30). The secure store (30) emails the originator with notification (60) when the recipient (12) retrieves the secure portion (24) of the email message (14).

22 Claims, 12 Drawing Sheets

SECURE MESSAGING

FIELD OF THE INVENTION

The present invention relates to transmission of messages. It particularly relates to transmission of email messages. Most particularly, it relates to transmission of email material of a confidential nature which must be maintained securely.

BACKGROUND OF THE INVENTION

It is readily possible to send a secure email message all be it somewhat complex. You need, as the sender an S/MIME compliant email software package and a copy of the recipient's public key.

In order to obtain the recipient's public key it is necessary for the recipient to enroll for a digital certificate. The enrollment process includes the creation of a public key and a private key, however care must be taken for the protection of the private key and trust must be established between the sender and the recipient's public key.

Trust leads to the need for a Certificate Authority, a mutually agreed entity that has been vetted and trusted by both parties by means of each party taking the additional step of installing the Certificate Authority's root certificate.

Additionally it is necessary to establish as to whether or not the recipient's public key has been stolen by means of checking a certificate revocation list, which first must be located and trusted. These requirements and others are called creating a Public Key Infrastructure (PKI) and necessitate the creation of security documentation called Certificate Policy (CP) and Certificate Practise Statement (CPS).

Despite S/Mime being readily available for many years there has been very little uptake of the method because of the high costs and skills required to roll out a PKI along with the need for some complex knowledge of public key encryption being required by both sender and recipient. In addition, the sender needs to make trust discussions as to the validity of the recipient's certificate which often leads to reading complex Certificate Policy documentation for each recipient copied on the email. This high cost and complexity along with problems distributing the recipient's public keys has prevented the adoption of the technology.

An additional problem linked with sending encrypted email message is namely that of content checking gateways. Such gateways usually require traversing in order to deliver the message successfully. These gateways are typically configured to check for viruses and sensitive words within the content of the message or attachment. In order for said gateway to achieve this check it is required that the gateway decrypts the message. This in turn requires that the gateway has access to the recipient's private key or that the gateway must be copied on the email which usually requires the sender to re-send and make trust decisions as to the validity of the gateway.

An alternative method employed by some systems is the sending of a program through email which, when opened by the recipient, prompts for a password and then automatically decrypts a message held within the program.

In recent time this last method has been shown to be unworkable because of email virus programs that employ the same method, namely that of assuming that the recipient will execute an attached program. The threat can be countered by content checking gateways or email programs which quarantine any attached executable programs and thus prevent their delivery.

A second alternative method is that of storing a message on an Internet facing web server and then delivering the message via the web server's secure communication link. This method has the draw back that the web server can be accessed by anyone, thus requiring a means of authenticating the recipient. The authentication can be achieved by means of the sender pre-agreeing a password with the recipient. The pre-agreed password requires a manual task on the part of the sender and fails to scale when sending high numbers of messages to multiple recipients.

The purpose of the present invention is to define a method and system whereby a recipient can read a secure message without the need for any additional software, any public keys or any complex encryption knowledge, the recipient only requiring standard email software, a web browser and a device capable of receiving their authentication code, for example, a mobile phone. In addition the method and system of the present invention provides a message capable of traversing any content checking email gateways and does not require the sender to take any additional manual tasks.

According to a first aspect, the present invention consists in a method for secure electronic communication of an email message from an originator to a recipient, said method comprising the steps of: said originator removing at least a portion of the content of the message; said originator employing first communication means to send the removed portion to an external store, said external store being operative to grant access to said stored removed portion upon presentation of an authentication code; said originator employing email to send the residue of the message, with notification that said removed portion is in said store, to said recipient; employing second communications means to send said authentication code to said recipient; said recipient accessing said external store; and said recipient employing third communication means to provide said external store with said authentication code for said external store to grant access to said removed portion.

According to a second aspect, the present invention consists in a system for secure electronic communication of an email message from an originator to a recipient, said system comprising: removal means for said originator to remove at least a portion of the content of the message; first communication means for said originator to send the removed portion to an external store, said external store being operative to grant access to said stored removed portion upon presentation of an authentication code; email means for said originator to send the residue of the message, with notification that said removed portion is in said store, to said recipient; second communications means for to send said authentication code to said recipient; accessing means for said recipient to access said external store; and third communication means for said recipient to provide said external store with said authentication code for said external store to grant access to said removed portion.

The invention further provides notification means for the store to send a notification message to the originator when the recipient has gained access to the removed portion.

The invention further provides that the store can be operative to generate at least a portion of the authentication code.

The invention further provides that the first communication means can include a secure Internet connection, that the secure Internet connection can employ encryption, and that the secure Internet connection can include the use of a Secure Socket Layer (SSL).

The invention further provides that the first communication means can comprise a secure network and that the secure network can include the use of encryption.

The invention further provides that the second communication means can include means to connect through a communications gateway, that the gateway can be a cellular telephone network, the invention including means to send the authentication code to the recipient as a visually readable message which can be a short message service text message or can include Unstructured Supplementary Service Data (USSD).

The invention further provides that the gateway can connect to a Microsoft Passport network and that the second communication means can send the authentication code via the recipient's passport.

The invention further provides that the gateway can connect to a Microsoft Messenger network and the second communication means can send the authentication code as an instant message.

The invention further provides that the gateway can connect to a pager network and that the second communication means can send the authentication code as a pager message.

The invention further provides that the gateway can connect to a voice network and that the second communication means can include means to generate the authentication code as a synthesised voice message.

The invention further provides that the authentication code can be uniquely generated for each stored portion.

The invention further provides for the inclusion of means to provide the identity of the originator along with the authentication code.

The invention further provides that the third means of communication can include a secure Internet connection from a web browser connecting via an encrypted link to a web server.

The invention further provides that the third means of communication can include a secure Internet connection from a web browser connecting via the URL HTTPS.

The invention further provides that the third means of communication can include a secure Internet connection from a web browser connecting via a Secure Socket layer (SSL) to a web server.

The invention further provides that the third means of communication can include a secure Internet connection from a web browser connecting via Transport Layer Security (TLS) to a web server.

The invention further provides that the third means of communication can include a secure Internet connection from a mobile device's Wireless Access Protocol (WAP) browser connecting to a WAP gateway.

BRIEF DESCRIPTION OF THE DRAWINGS

The invention is described and explained in more detail, by way of example, by the following description to be read in conjunction with the appended drawings in which.

PARTICULAR DESCRIPTION

Figure 1:
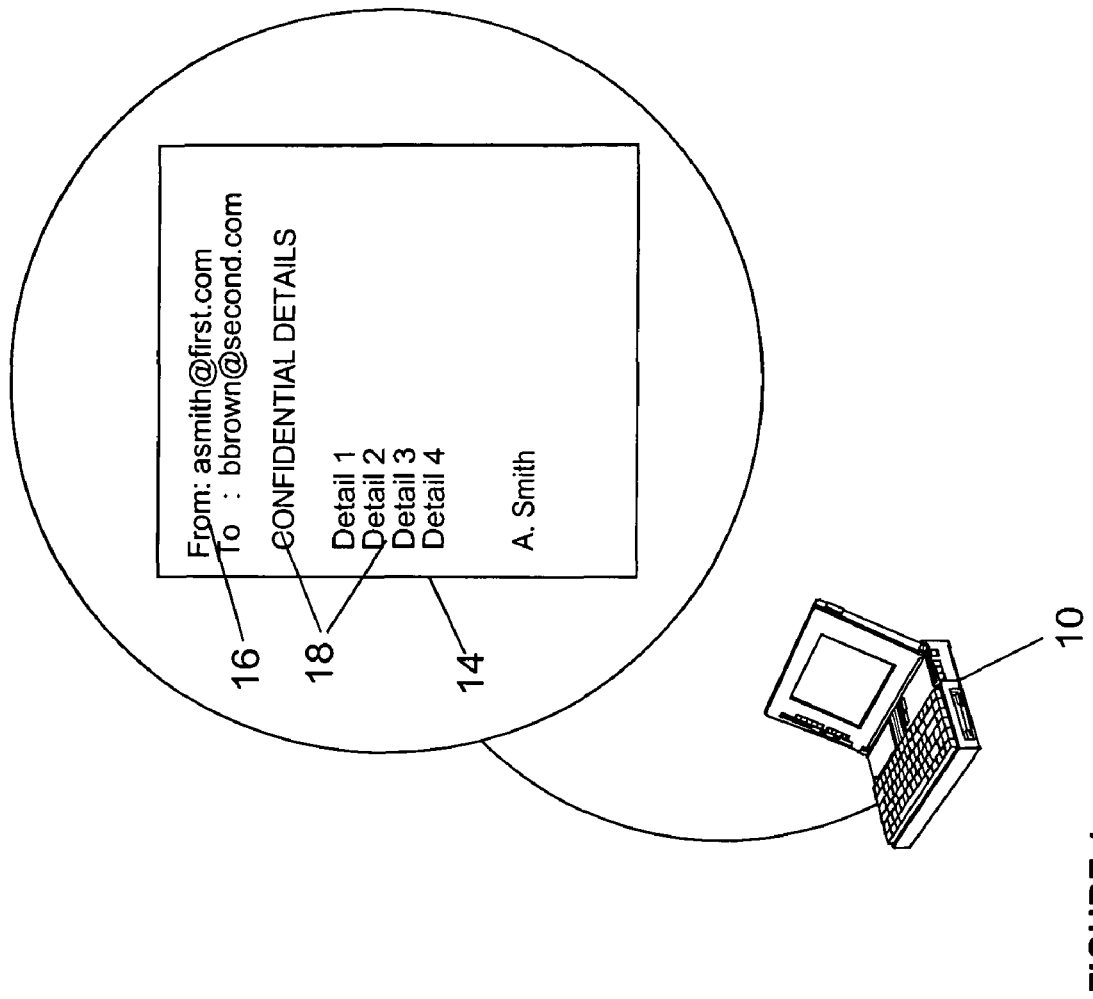
FIG. 1 is a schematic diagram illustrating a first stage in the sending and receiving of a secure message.
Figure 1:
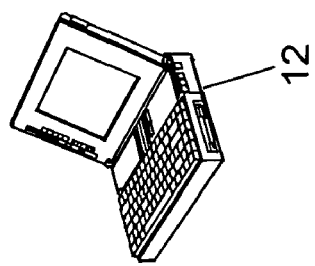

Attention is first drawn to FIG. 1 showing a schematic diagram of the first action of a message originator within the scheme of the present invention.

A first computer 10, acting as a message originator, wishes to send a secure email to a second computer 12 which acts as the message recipient. The first computer 10 first prepares an email message 14 in the normal manner, which could be sent in the normal manner but, in this application, is sent in a secure manner. The email message 14 includes addressing details 16 as one portion and confidential details 18 as a second portion.

Figure 2:
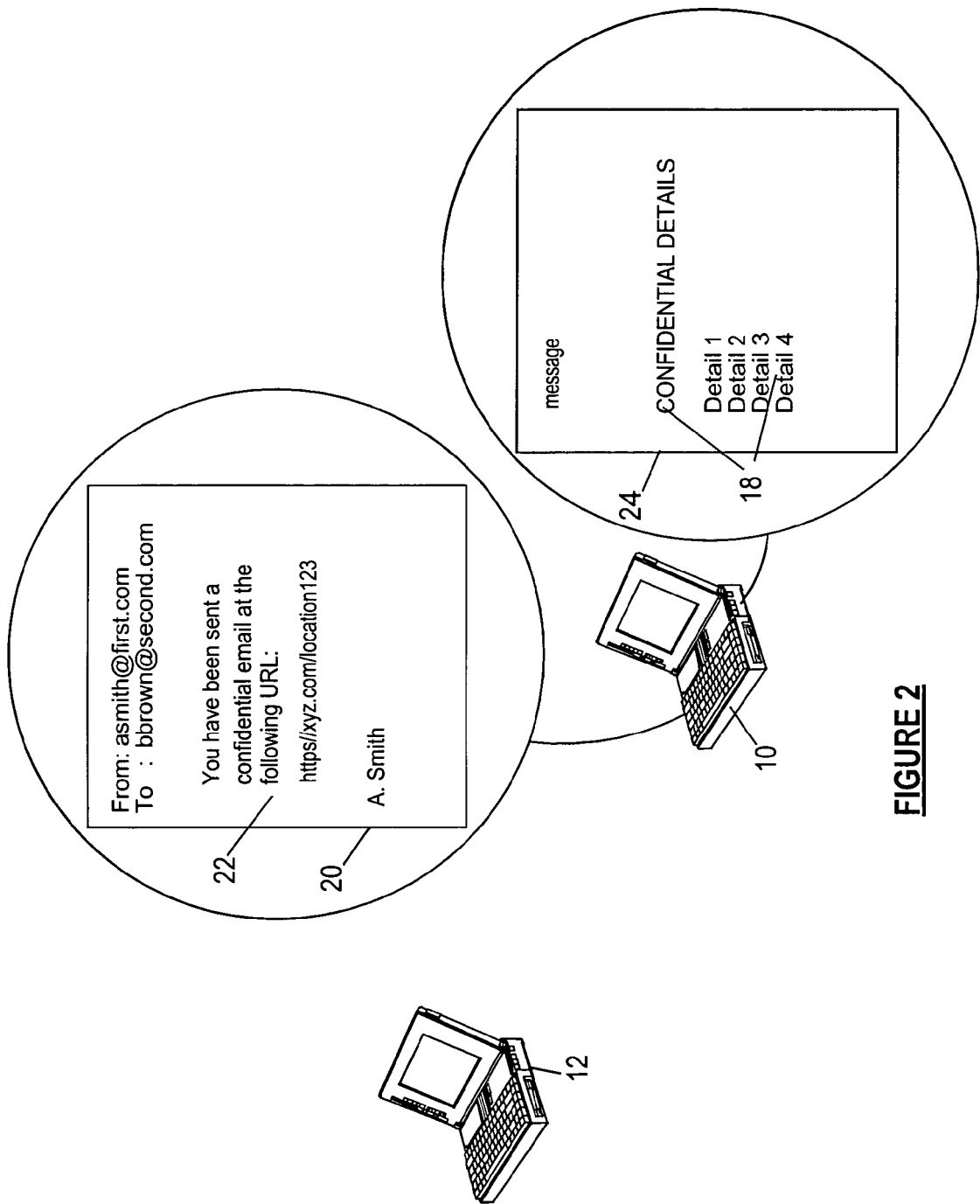
FIG. 2 is a schematic diagram showing a second stage in the sending and receiving of a secure message.

Attention is next drawn to FIG. 2 showing the next stage in the process whereby the first computer 10 can send a secure email message 14 to a second computer 12.

A program on the first computer 10 splits the email message 14 into a first email message 20 where the program has selected the confidential details of the second portion 18 of the email message 14 to be removed and replaced it by a notification message 22 which contains an indication where the confidential details of the second portion 18 may be found by the second computer 12, and by a second message 24 which contains the confidential detail of the second portion 18 of the email message 14.

Figure 3:
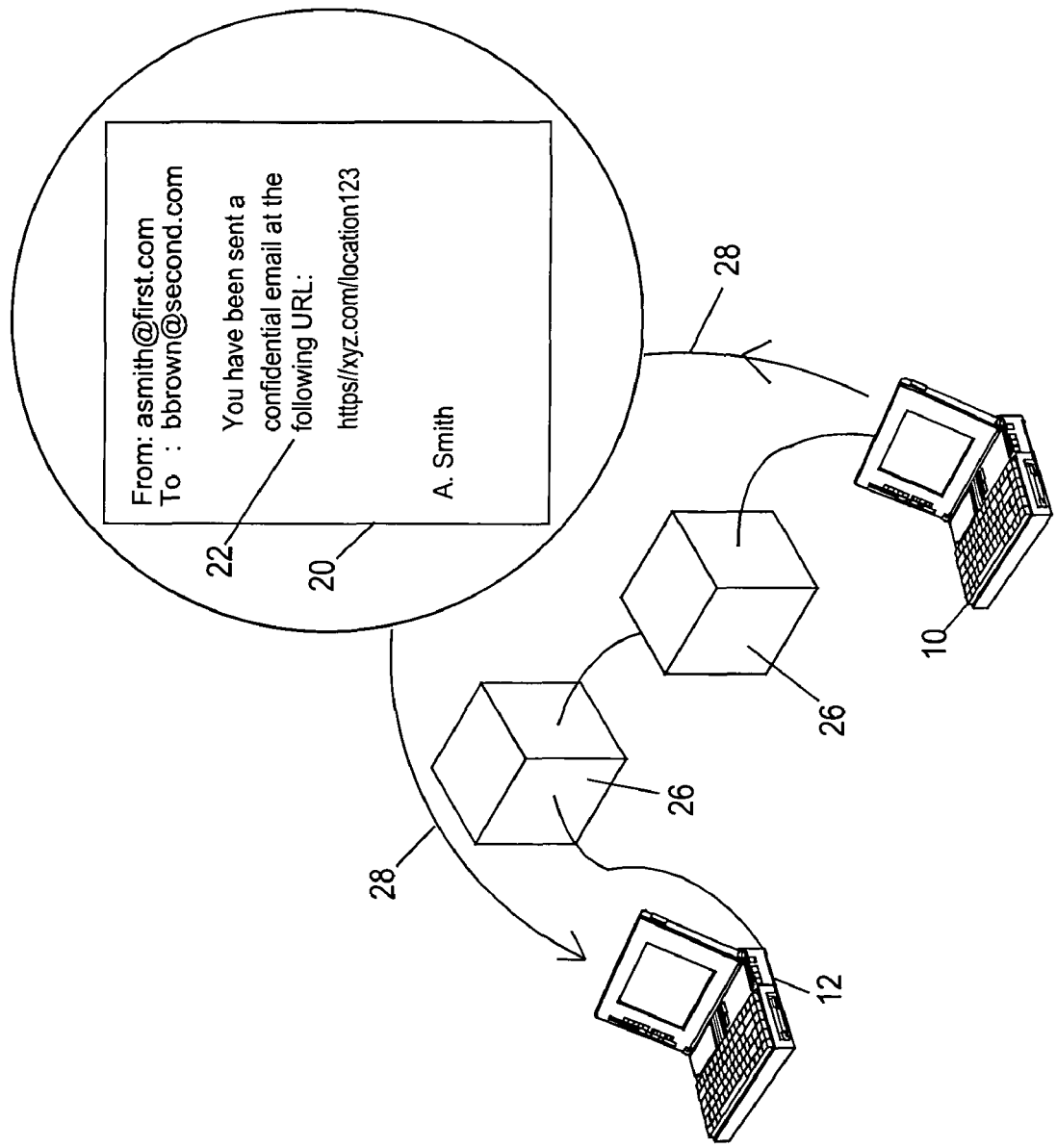
FIG. 3 is a schematic diagram showing a third stage in the sending and receiving of a secure message.

Attention is next drawn to FIG. 3 showing the next stage in the process whereby the first computer 10 can send a secure email message 14 to a second computer 12. Here a program on the first computer 10 looks up the recipient's mobile phone number from the email address book (if known) or prompts the sender for this information and then contacts a storage site 30 and requests a location identifier. Next the program sends the first email message 20 containing the notification message 22 along with the location identifier through the various Internet Service Providers (ISP's) 26, as indicated by arrows 28 to the second computer 12, using the normal email communications method.

Figure 4:
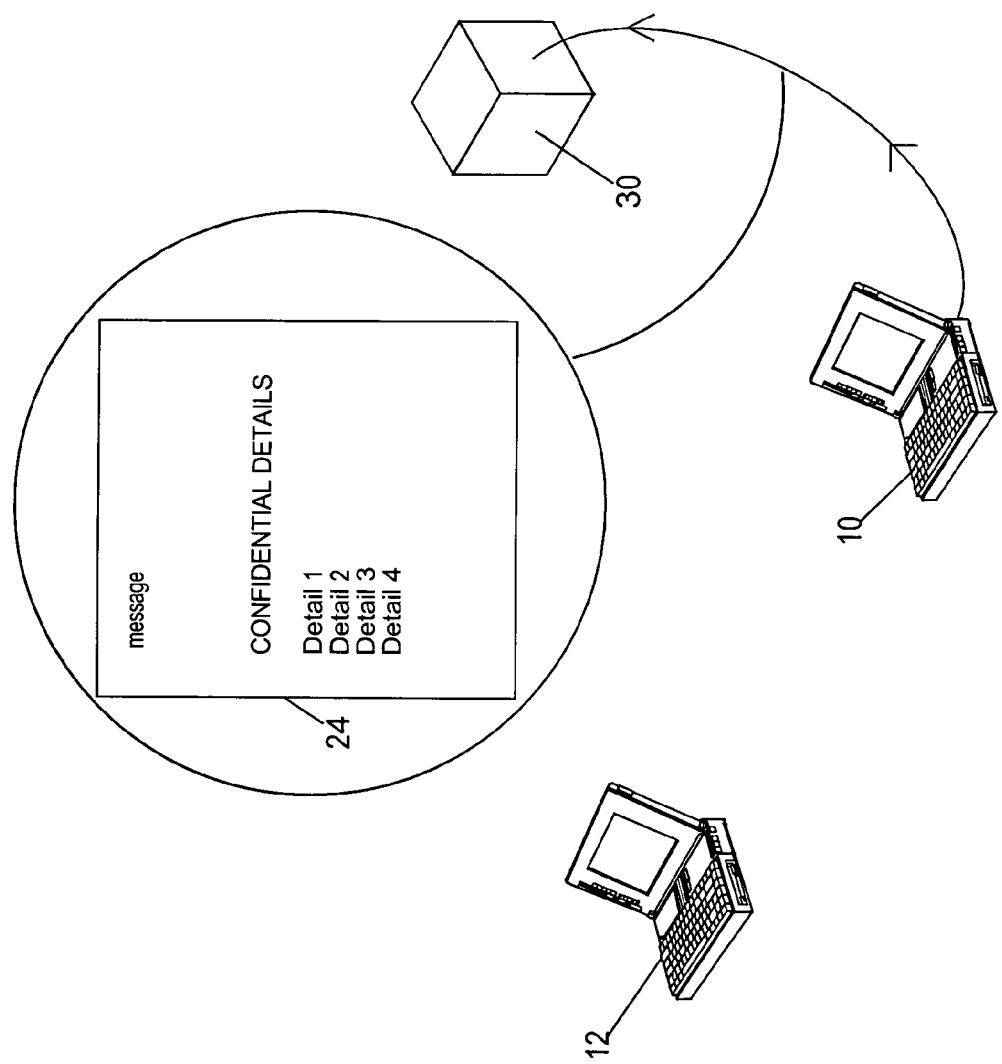
FIG. 4 is a fourth stage in the sending and receiving of a secure message, illustrated by a schematic diagram.

Attention is next drawn to FIG. 4, which shows the next stage in which the first computer 10 can send a secure email to the second computer 12. The first computer 10, having sent the first email message 20 to the second computer 12 through the existing email system, then sends the second message 24, through a secure connection to a secure storage site 30 (first shown in FIG. 4) along with any attachments and the recipient's mobile phone number. The storage site 30 stores the received data.

Figure 5:
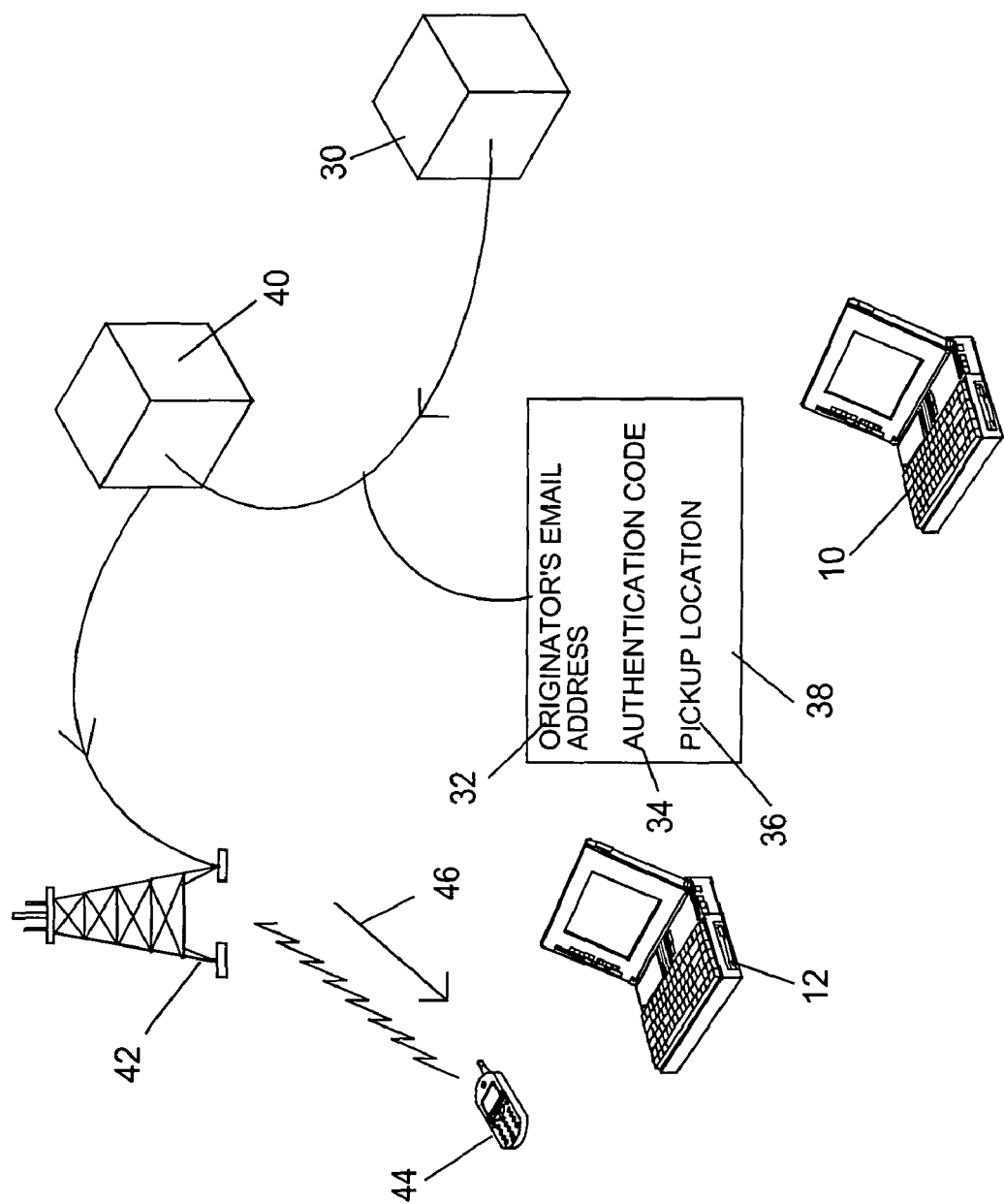
FIG. 5 is a schematic diagram of a fifth stage illustrating the sending of an authentication code.

Attention is now drawn to FIG. 5, showing the fifth stage in the transfer of a secure email message from the first computer 10 to a second computer 12.

The storage site 30 has stored the second message 24 at the location defined in the notification message 22 along with the senders email address 32. The storage site 30 next generates an authentication code 34 and constructs an authentication message 38, including sender information 32, the authentication code 34 and optionally a pickup location 36.

The storage site 30 communicates through a messaging service providers gateway 40, in this example connected to a cellular telephone system 42 to communicate the authentication message in the form of a short message service message (SMS) (a transmission of visually readable characters) to the recipient's mobile telephone 44 as indicated by arrow 46.

Figure 6:
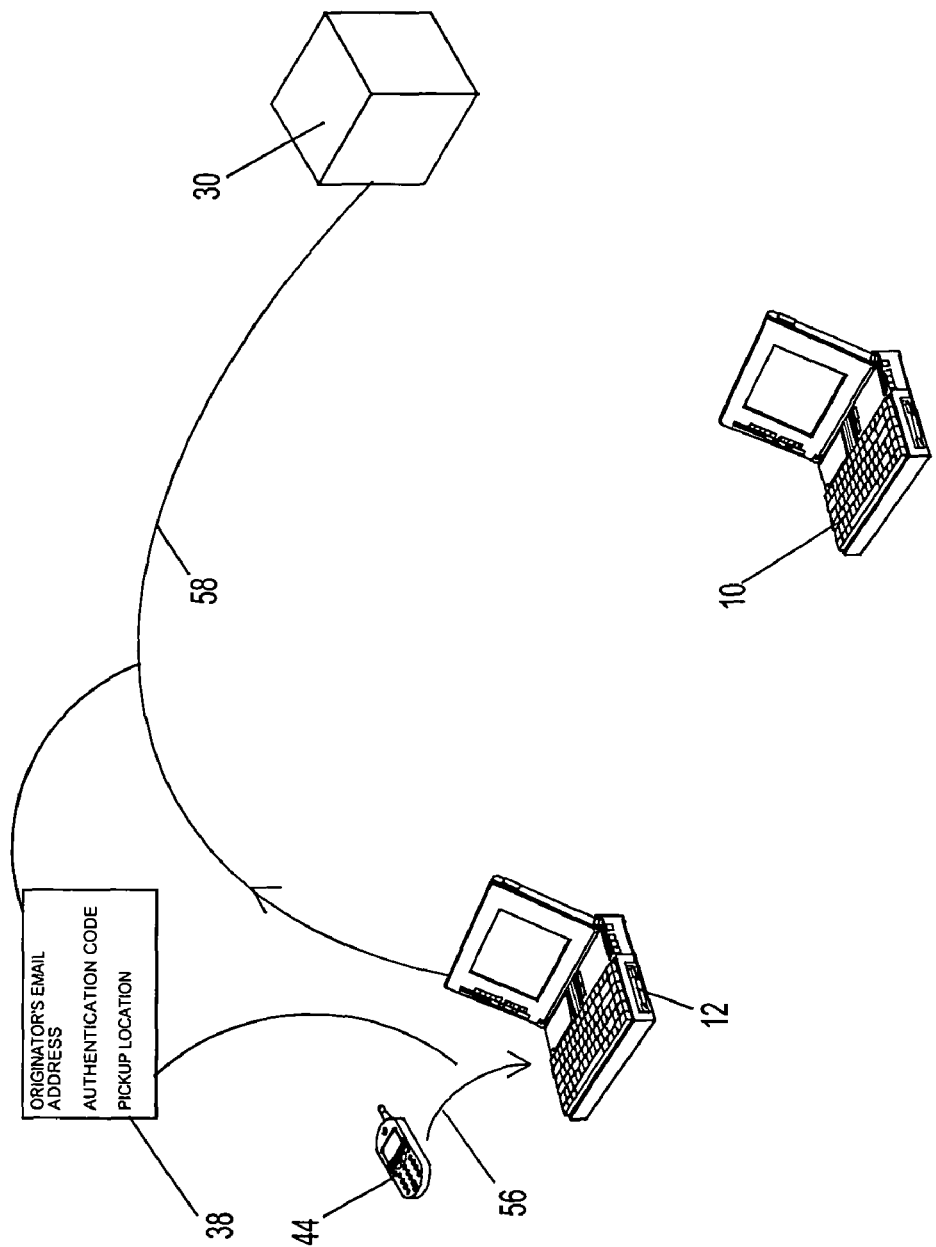
FIG. 6 shows a sixth stage illustrating the authentication of the recipient.

Attention is next drawn to FIG. 6 showing the next stage in the transmission of a secure email message from a first computer 10 to a second computer 12.

The recipient when wishing to access the secure portion of the received email message, makes a secure connection across the Internet to the storage site 30 by following the URL link in the initially received email message 20.

The authentication code within the authentication message 38 is transferred from the recipient's mobile telephone 44 as indicated by arrow 56 to be sent by the second computer 12 as indicated by arrow 58 to the storage site 30 for authentication.

Figure 7:
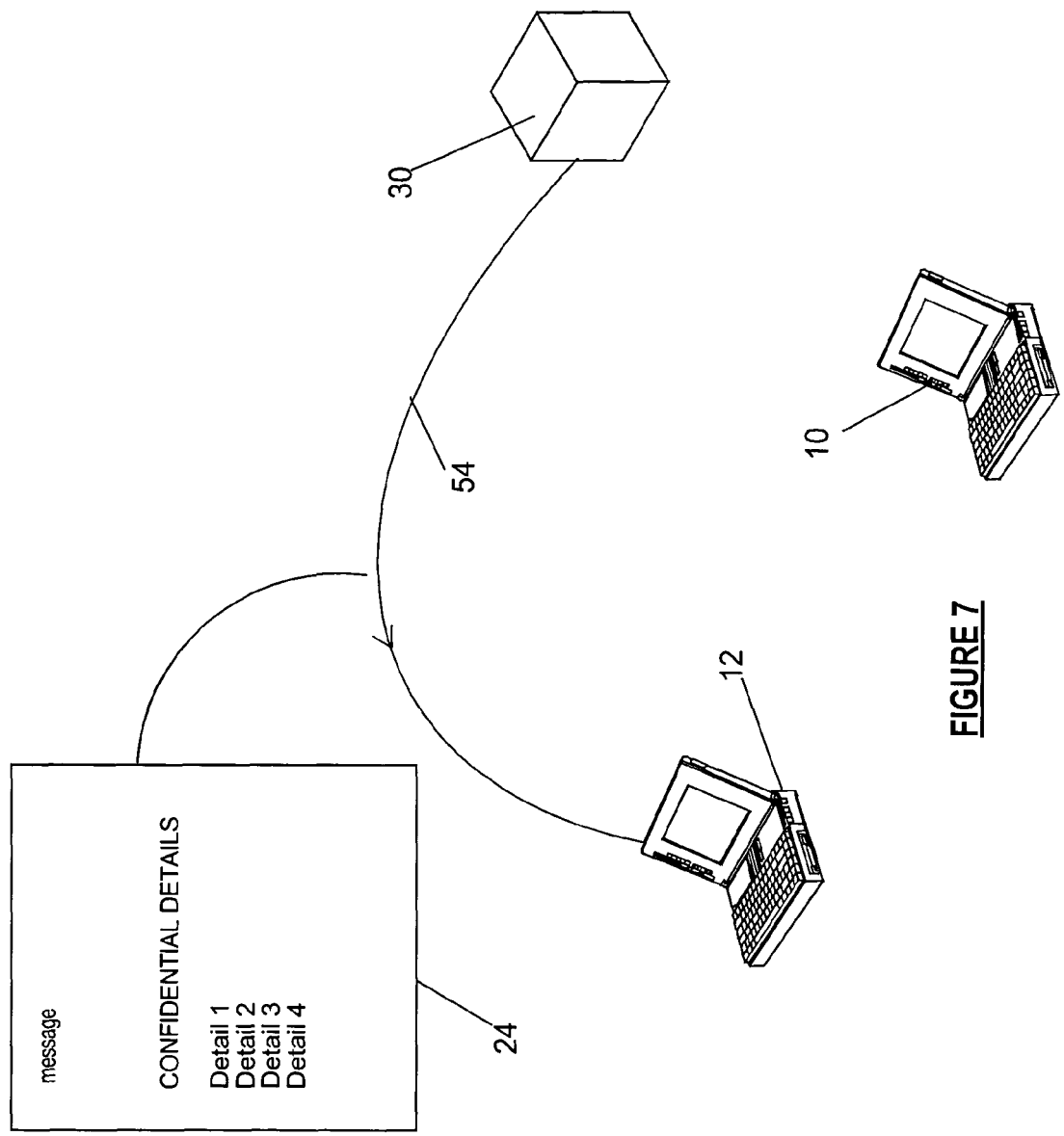
FIG. 7 shows a seventh stage in the sending and receiving of a secure message, illustrating the downloading of the secure portion of the message.

Attention is next drawn to FIG. 7 showing the penultimate stage in transfer of a secure email message from a first computer 10 to a second computer 12.

If the storage site 30 recognises the authentication code 34 from the second computer 12 as being valid, the storage site 30 sends the second email message 24, as indicated by arrow 54 to the second computer 12. The second email message is sent, in this example, across a secure encrypted link such as Secure Socket Layer (SSL). A "socket" denotes the connection of one computer to another. Of course, the present invention encompasses the use of any other type of secure link.

Figure 8:
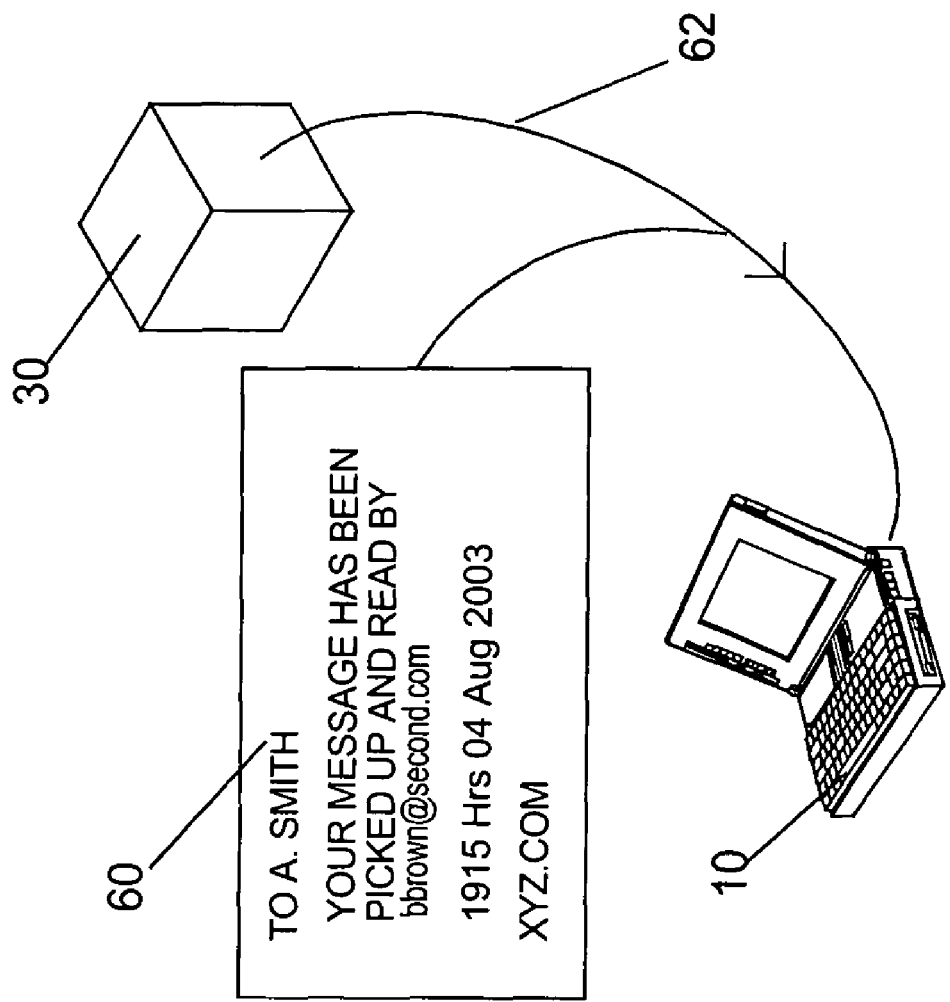
FIG. 8 shows an optional eighth stage in the sending and receiving of a secure message, illustrating a delivery receipt.

Attention is next drawn to FIG. 8 showing the final stage in the transfer of a secure or confidential message from a first computer 10 to a second computer 12.

Having delivered the second email message 24 to the second computer 12 the storage site 30 then sends a delivery confirmation message 60 to the first computer 10 as indicated by arrow 62. If delivery has failed, the confirmation message is, by contrast, an "indication of failure to deliver" message.

Figure 9:
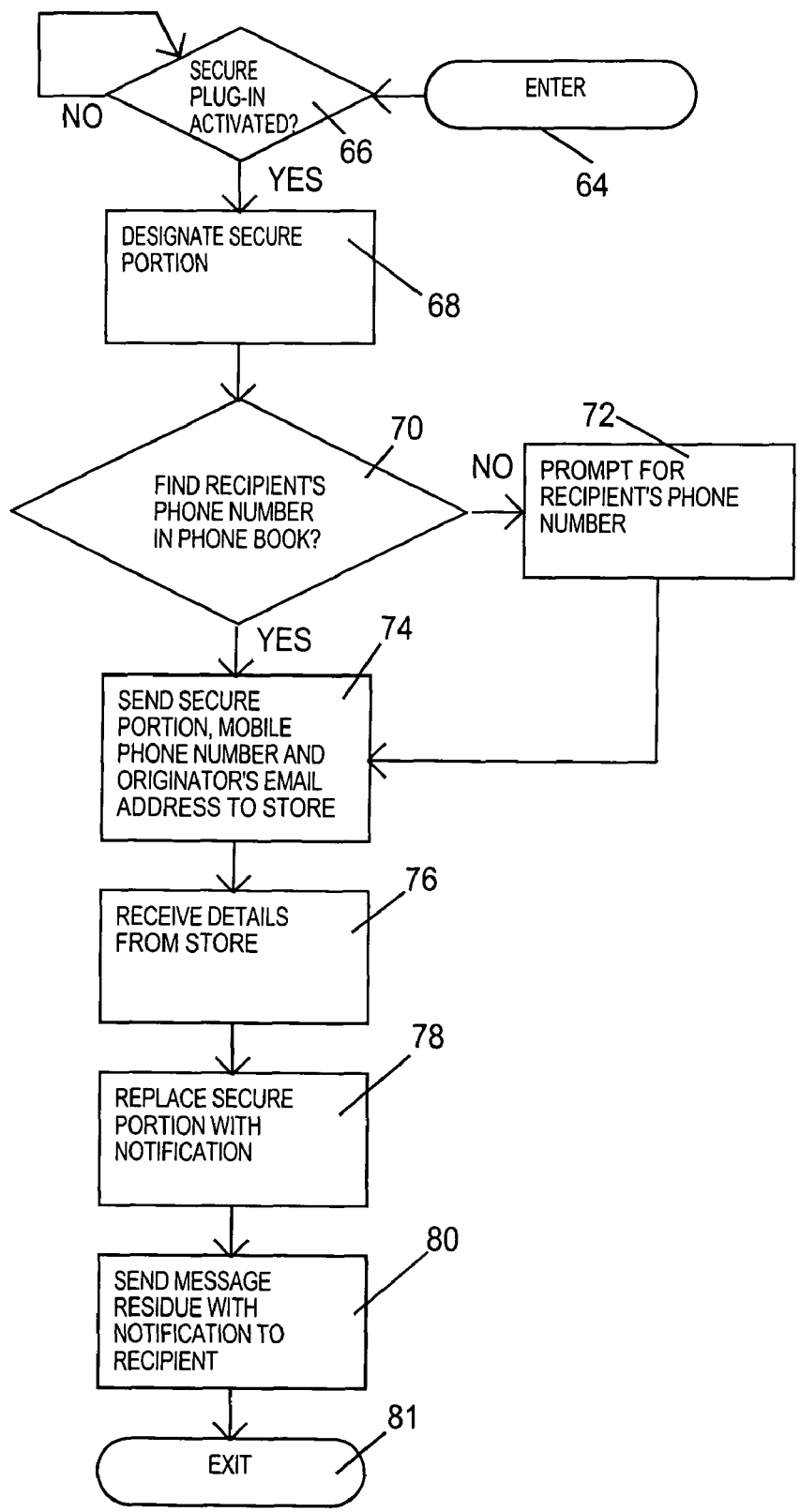
FIG. 9 is a flow chart showing the action of the originating apparatus in the processes of FIGS. 1-4.

Attention is next drawn to FIG. 9 showing a flow chart of the activity of the message originating first computer 10 when performing according to the present invention.

From entry 64 a first test 66 has a plug-in (additional computer program) on the existing email software of the first computer 10 check to see if the originator of the email message 14 has indicated to the first computer 10 that the message is to be sent securely.

If the first test 66 detects that the email message 14 is to be sent in a secure manner by means of the sender activating the plug-in, a first operation 68 designates that part of the email message 14 that is to be the secure portion 18 containing the confidential details. A second operation 70 looks up, in this example, the mobile phone number from the email address book on computer 10. If this is unavailable, the sender is prompted to provide this information by a third operation 72. Next a fourth operation 74 sends the confidential and secure portion 18 along with, in this example, the recipient(s) mobile phone number(s) and sender's email address to the storage site 30.

The fourth operation 74 sends the secure portion 18 of the email message 14 to the storage site 30, for preference, using a secure Network which, again for preference, employs encryption so that the secure portion can arrive at the store without risk of interception and scrutiny. The preferred method of transmission employs a Secure Socket Layer (SSL), i.e. a connection between two data processing entities employing encryption.

The secure store 30 can be anywhere on the Internet. Another alternative application for the present invention is where the secure store 30 comprises part of an internal Internet system, for example, within a company, known as an INTRANET. The secure store 30 can, in this example, be accessed from within the INTRANET or externally, through the Internet making connection to the INTRANET.

After the fourth operation 74, a fifth operation 76 receives details of the storage location identifier.

A sixth operation 78 then replaces the secure portion having the confidential details 18 with the notification message 22, which contains the storage location identifier necessary to retrieve the stored portion.

A seventh operation 80 then sends the message residue 20 containing the notification message 22 to the second computer 12 by instructing the existing email software to send, and then proceeds to exit 81.

Figure 10:
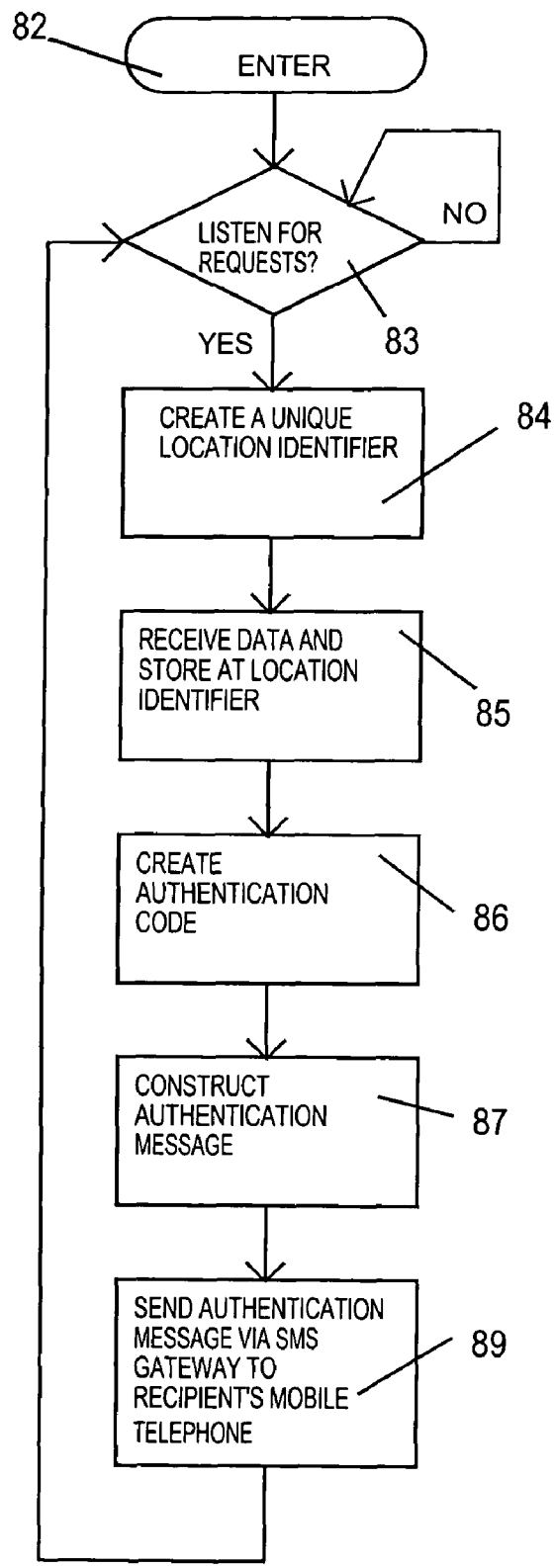
FIG. 10 is a flow chart showing the actions of the storage site receiving messages, illustrated in FIGS. 4-6.

Attention is next drawn to FIG. 10 showing the operation of the storage site 30 when receiving secure messages from computer 10 described in the earlier figures.

From entry 82 a listening process in the form of a second test 83 is started. If no requests are sent, process 83 continues to listen.

When computer 10 contacts this process, an eighth operation 84 creates a unique location identifier for subsequent storage and retrieval of secure data. The location identifier points to, in a well known example, a designated sub site on the URL identified, and is shown, again as an example, after the second/on the store's 30 web name in the notification message 22 shown in FIG. 3.

Next, a ninth operation 85 receives information from the sending computer 10 including the secure portion of the message, in this example, the mobile phone number(s) of one or more of the recipient's and the sender's email address and stores it at the location identified in the eighth operation 84. A tenth operation 86 then creates an authentication code, typically six to ten characters, and moves to an eleventh operation 87 which constructs an authentication message 38 containing the sender's email address (for reference), the authentication code created in the tenth operation 86 and an optional pickup location as created in the eighth operation 84. Finally, a twelfth operation 88 sends the authentication message 38, created in the eleventh operation 87, through, in this example, the SMS gateway 40, that in turn is delivered to the recipient's mobile phone 44, as a text message. Control is then passed back to the second test 83 to continue listening for further requests.

The SMS message is a visually readable message. The present invention also encompasses the visually readable message can be of various different alternative forms.

One alternative form is as an Unstructured Supplementary Service Data (USSD) message, where the signaling codes, used in a telephone network, for example, to indicate redirection of calls, the use of other services, messages etc are used to send the visually readable message.

Another alternative form for the visually readable message is as a picture transmitted on a multi-media message service, a feature of the recently introduced multi-media enabled cellular telephones.

Another alternative form for the visually readable message is as an automatically generated facsimile message (FAX).

Another alternative form for the visually readable message is as a pager message, in which instance the gateway connects to a pager network.

Another alternative for the visually readable message is as an "Instant Message" for a Microsoft Messenger Network, a feature of the Windows XP and the Pocket PC operating systems marketed by Microsoft Corporation, in which "Instant Messages" are sent as text. The gateway, of course, in this instance, must provide appropriate connection.

Another alternative for the visually readable message is as a message on a Microsoft Passport network, proprietory to Microsoft Corporation, employing the recipient's "passports".

Of course, these are simply examples, and the invention encompasses any form of transmission of a visually readable image.

The authentication code can also be of a non-visually readable form, and, for example, can consist of a synthesized voice message, which can be instantly delivered, or stored for retrieval at a later time.

Figure 11:
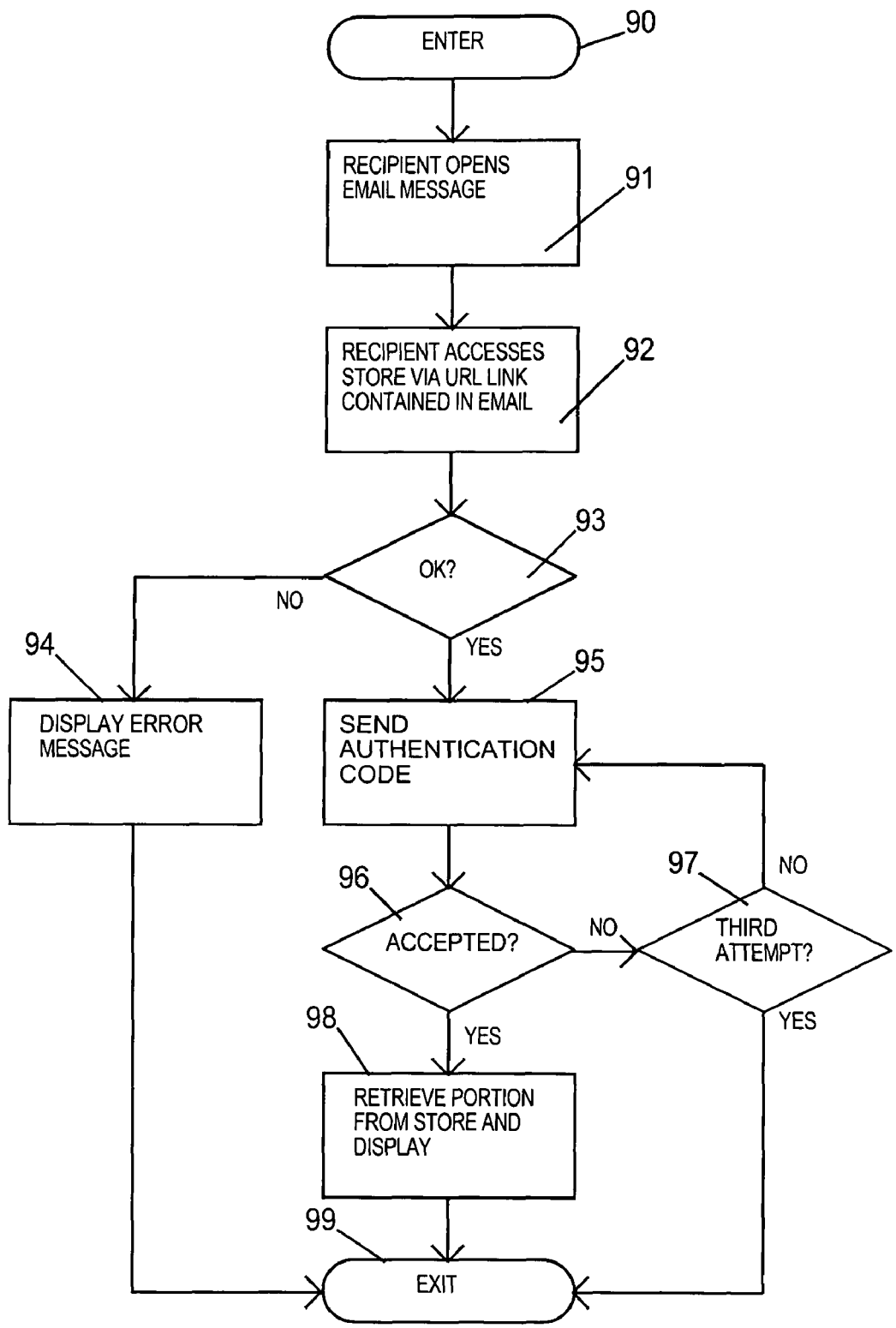
FIG. 11 is a flow chart showing the actions of the recipient retrieving the secure message as otherwise illustrated in FIGS. 6 and 7.

Attention is next drawn to FIG. 11 showing the operation of the second computer 12 in the processes described in the earlier figures.

From entry 90 a thirteenth operation 91 has the recipient on the second computer 12 receive the email message sent in the seventh operation 80 and view it with their existing non-modified email client software. Next, a fourteenth operation 92 has the recipient access the storage site 30 via an encrypted link across the Internet, by accessing the URL address contained within the first portion 20 of the email message 14. A third test 93 then checks whether access to the secure storage site 30 has been achieved and, if not, passes control to a sixteenth operation 94 which displays the error message sent from secure site 30 and moves to exit 99. If access to the secure storage site 30 has been achieved, the second computer 12, in a seventeenth operation 95, sends the authentication code 34 to the secure storage site 30.

The authentication code 34 can have been acquired by manual entry from the received text message by the recipient's mobile telephone 44. As an alternative, the recipient's mobile telephone 44 could have been integral with the second computer 12 so that the authentication code can be automatically known and transferred. Alternatively again, the second computer 12 could be a personal digital assistant, which is basically a telephone/computer with direct connection to the cellular telephone system 42.

In a fourth test 96 the recipient at the second computer 12 awaits confirmation from the secure storage site 30 that the authentication code 34 has been recognized and accepted.

If the authentication code is not successfully accepted, a fifth test 97 permits the user to send the authentication code 34 up to three (or more) times by returning control to the seventeenth operation 95. After three failed attempts the recipient's email message will be denied access indefinitely and control moves to exit 99.

If the recipient at computer 12 receives notification that his authentication code 34 has been recognized, an eighteenth operation 98 retrieves the second email message 24 from the secure storage site 30 and displays it along with any email attachments, within the recipient's Internet browser. At this point control is passed to exit 99.

Figure 12:
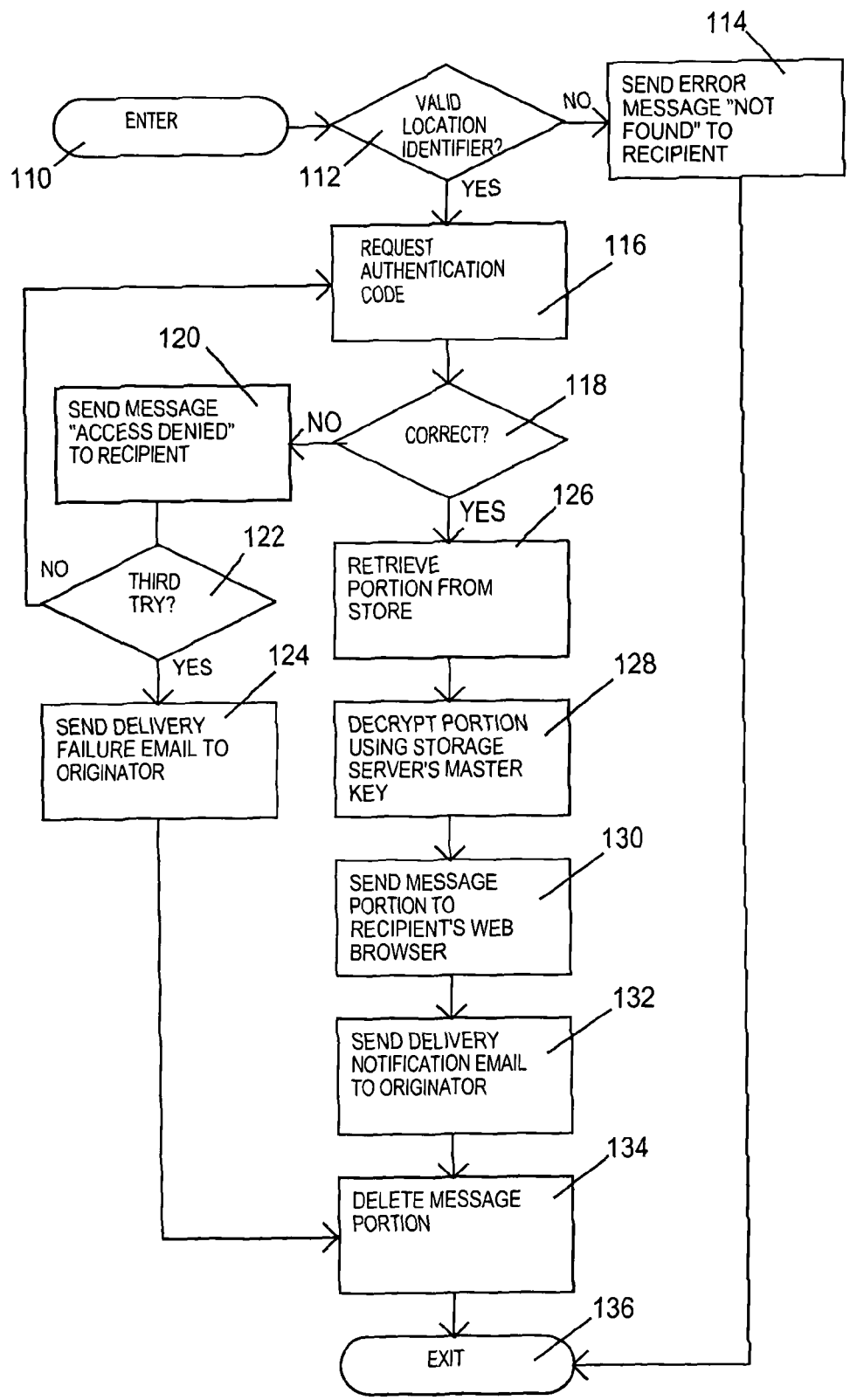
FIG. 12 is a flow chart showing the activity of the message store authenticating and sending messages otherwise discussed with regard to FIG. 4 through 8.

Attention is next drawn to FIG. 12, a flow chart showing the activity of the secure storage site 30 when sending the stored message to the second computer 12. For preference, the recipient 12 communicates with the secure storage site 30 using a encrypted Internet connection from the web browser via an encrypted link to the secure storage site 30, which is associated with a web server. Another alternative is for the recipient 12 to communicate with the secure storage site using a secure Internet connection from a web browser connecting via the URL HTTPS (a secure version of the HTTP protocol) to a web server associated with the secure storage site 30. Another alternative is for the recipient 12 to communicate with the secure storage site 30 using a secure Internet connection from a web browser connecting via a Secure Socket layer (SSL) to the web server associated with the secure store 30. Another alternative is for the recipient 12 to communicate with the secure store 30 using a secure Internet connection from a web browser connecting via Transport Layer Security (TLS) to the web server associated with the secure store 30. Another alternative is for the recipient 12 to communicate with the secure storage site 30 using a secure Internet connection from a mobile device Wireless Access Protocol (WAP) browser connecting to a WAP gateway.

When the recipient at computer 12 first contacts the secure store 30, via their web browser, a web site address (URL) is passed to a web server, which action initiates entry 110. Control is then handed to a sixth test 112 which validates the location identifier supplied within the URL and, if no message can be located within the supplied location, control is passed to a nineteenth operation 114 which sends an error message to the recipient and then passes to exit 136.

If a valid message can be located, the sixth test 112 passes control to a twentieth operation 116 which requests the recipients at the second computer 12 to send the authentication code 34.

A seventh test 118 checks the validity of the received authentication code 34 against the value stored within the secure store 30. If the authentication code 34 fails, control is passed to a twenty first operation 120 which sends an "access denied" message to the recipient and control is then passed to an eighth test 122 which validates how many attempts since the initial storage of the message portion have been made. If this is greater than three (or a configurable value) control is passed to a twenty-second operation 124 which constructs a failure email message notification and sends it to the sender at computer 10. Control then passes to a twenty-third operation 134 which deletes the stored message portion and other details and then proceeds to exit 136.

If however, there have been less than three tries, the eighth test 122 passes control back to the twentieth operation 116 to enable a new authentication attempt.

If the seventh test 118 detects correct authentication of the supplied authentication code 34 from the recipient, control passes to a twenty-fourth operation 126 where the stored message portion 24, along with any attachments, is retrieved from the secure store 30.

A twenty-fifth operation 128 next decrypts the retrieved information using a master key known only to the secure storage site 30 and moves to a twenty-sixth operation 130 in which a web page is constructed containing the secure message portion 18 along with any attachments and then is transmitted via an encrypted link to the recipient's web browser located at the second computer 12.

An optional twenty-seventh operation 132 then constructs a notification email to the sender at the first computer 10 confirming that a successful transmission of email message 14 has been made along with date and time sent.

Control then passes to the twenty third operation 134 which, as earlier described, deletes the stored message and any associated information and moves to 136 exit 136.

MICROSOFT, POWER PC, WINDOWS, WINDOWS XP, MICROSOFT WINDOWS, MICROSOFT MESSENGER and MICROSOFT PASSPORT are all trademarks of Microsoft Corporation and are here acknowledged as such.

The disclosures of applicant's GB Appln 0217882.0 filed 1 Aug. 2002 and EP 03254769.7 filed 30 Jul. 2003 are incorporated herein by reference.

The invention is further clarified and explained by the following claims.

The invention claimed is:

1. A method for secure electronic communication of an email message from an originator to a recipient, said method comprising the steps of:
said originator removing a security sensitive portion of the message;
said originator employing a first network connection to send the removed portion to an externally accessible store, said externally accessible store being operative to grant access to said stored removed portion upon presentation of a two factor authentication, the two factors comprising an authentication code and a reference code;
said originator employing email to send the residue of the message, along with one, only, of the two factors and notification that said removed portion is in said store, via an external Internet connection to said recipient;
said originator employing a second external network connection to send another, only, of the two factors to said recipient separately from the one factor;
said recipient receiving said one of the two factors and said notification by said email and said recipient receiving said another of the two factors, by said second external network, separately from said email;
said recipient accessing said external store; and
said recipient employing a third external network connection to provide said externally accessible store with the necessary two factor authentication comprising said reference code and said authentication code and for said store to grant external access to said removed portion.

2. A method, according to claim 1, wherein said first network connection includes at least one of: a secure Internet connection; a secure Internet connection using encryption; a secure Internet connection including a Secure Socket Layer (SSL); a secure network connection; and a secure network connection including encryption.

3. A method, according to claim 1, wherein said second network connection includes connection through a gateway; said gateway comprising at least one of: a cellular telephone network; a cellular telephone network selectably operable to send said another only of the two factors to said recipient as a visually readable short message service text message; a Microsoft Passport network, said method including the step of sending said another only of the two factors via said recipient's passport; a Microsoft Messenger network, said method including the step of sending said another only of the two factors as an instant message; a pager network, said method including the step of sending said another only of the two factors as a pager message; a voice network, said method including the step of generating said another only of the two factors as a synthesised voice message; and a network operative to send said another only of the two factors as Unstructured Supplementary Service Data (USSD).

4. A method, according to claim 2, wherein said second network connection includes connection through a gateway; said gateway comprising at least one of: a cellular telephone network; a cellular telephone network selectably operable to send said another only of the two factors to said recipient as a visually readable short message service text message; a Microsoft Passport network, said method including the step of sending said another only of the two factors via said recipient's passport; a Microsoft Messenger network, said method including the step of sending said another only of the two factors as an instant message; a pager network, said method including the step of sending said another only of the two factors as a pager message; a voice network, said method including the step of generating said another only of the two factors as a synthesised voice message; and a network operative to send said another only of the two factors as Unstructured Supplementary Service Data (USSD).

5. A method, according to claim 1 wherein said third network connection includes at least one of: a secure Internet connection from a web browser connecting via an encrypted link to a web server; a secure Internet connection from a web browser connecting via the URL HTTPS; a secure Internet connection from a web browser connecting via a Secure Socket layer (SSL) to a web server; a secure Internet connection from a web browser connecting via Transport Layer Security (TLS) to a web server; and a secure Internet connection from a mobile device's Wireless Access Protocol (WAP) browser connecting to a WAP gateway.

6. A method, according to claim 2 wherein said third network connection includes at least one of: a secure Internet connection from a web browser connecting via an encrypted link to a web server; a secure Internet connection from a web browser connecting via the URL HTTPS; a secure Internet connection from a web browser connecting via a Secure Socket layer (SSL) to a web server; a secure Internet connection from a web browser connecting via Transport Layer Security (TLS) to a web server; and a secure Internet connection from a mobile device's Wireless Access Protocol (WAP) browser connecting to a WAP gateway.

7. A method, according to claim 3 wherein said third network connection includes at least one of: a secure Internet connection from a web browser connecting via an encrypted link to a web server; a secure Internet connection from a web browser connecting via the URL HTTPS; a secure Internet connection from a web browser connecting via a Secure Socket layer (SSL) to a web server; a secure Internet connection from a web browser connecting via Transport Layer Security (TLS) to a web server; and a secure Internet connection from a mobile device's Wireless Access Protocol (WAP) browser connecting to a WAP gateway.

8. A method, according to claim 4 wherein said third network connection includes at least one of: a secure Internet connection from a web browser connecting via an encrypted link to a web server; a secure Internet connection from a web browser connecting via the URL HTTPS; a secure Internet connection from a web browser connecting via a Secure Socket layer (SSL) to a web server; a secure Internet connection from a web browser connecting via Transport Layer Security (TLS) to a web server; and a secure Internet connection from a mobile device's Wireless Access Protocol (WAP) browser connecting to a WAP gateway.

9. A method, according to claim 1, wherein said authentication code is uniquely generated for each stored portion.

10. A method, according to claim 1, including the step of providing the originator's identity along with said authentication code.

11. A method, according to claim 1, wherein said store is operative to generate at least a portion of said authentication code.

12. A method, according to claim 1, including the step of causing said store to send a notification message to said originator when said recipient has gained access to said removed portion.

13. A system for secure electronic communication of an email message from an originator to a recipient, said system comprising:

a message splitter operative to split the email message between a first email message and a second message, removing at least a security sensitive portion of the email message to make the second message;

a second message sender for sending the second message, comprising the removed portion, via a first network connection to an external externally accessible store, said externally accessible store being operative to grant access to said stored removed portion upon presentation of a two factor authentication, the two factors comprising an authentication code and a reference code;

a sender for sending one, only, of the two factors to said recipient via a second, external network connection;

a first email message sender for sending the first email message, comprising the residue of the message, along with another, only, of the two factors and notification that said removed portion is in said externally accessible store, via an external Internet connection, to said recipient;

accessing means for said recipient to access said externally accessible store; and a third network connection for said recipient to provide said externally accessible store with said two factor authentication comprising said reference code and said authentication code for said externally accessible store to grant external access to said removed portion.

14. A system, according to claim 13, wherein said first network connection includes at least one of: a secure Internet connection; a secure Internet connection using encryption; a secure Internet connection including a Secure Socket Layer (SSL); a secure network connection; and a secure network connection including encryption.

15. A system, according to claim 13, wherein said second network connection includes connection through a gateway; said gateway comprising at least one of: a cellular telephone network; a cellular telephone network selectably operable to send said another only of the two factors to said recipient as a visually readable short message service text message; a Microsoft Passport network operative to carry said another only of the two factors via said recipient's passport; a Microsoft Messenger network operative to carry said another only of the two factors as an instant message; a pager network operative to carry said another only of the two factors as a pager message; a voice network operative to carry said another only of the two factors as a synthesised voice message; and a network operative to carry said authentication code as Unstructured Supplementary Service Data (USSD).

16. A system, according to claim 14, wherein said second network connection includes connection through a gateway; said gateway comprising at least one of: a cellular telephone network; a cellular telephone network selectably operable to send said another only of the two factors to said recipient as a visually readable short message service text message; a Microsoft Passport network operative to carry said another only of the two factors via said recipient's passport; a Microsoft Messenger network operative to carry said another only of the two factors as an instant message; a pager network operative to carry said another only of the two factors as a pager message; a voice network operative to carry said another only of the two factors as a synthesised voice message; and a network operative to carry said another only of the two factors as Unstructured Supplementary Service Data (USSD).

17. A system, according to any of claims 13 to 16 wherein said third network connection includes at least one of: a secure Internet connection from a web browser connecting via an encrypted link to a web server; a secure Internet connection from a web browser connecting via the URL HTTPS; a secure Internet connection from a web browser connecting via a Secure Socket layer (SSL) to a web server; a secure Internet connection from a web browser connecting via Transport Layer Security (TLS) to a web server; and a secure Internet connection from a mobile device's Wireless Access Protocol (WAP) browser connecting to a WAP gateway.

18. A method for secure electronic communication of an email message with a security sensitive portion from an originator to a recipient, said method comprising the steps of:

said originator removing the security sensitive portion of the message; providing a first network connection and an externally accessible store operative to grant access to the removed portion of the message upon presentation of a two factor authentication, the two factors comprising an authentication code and a reference code;

said originator employing said first network connection to send the removed portion of the message to the external store, said originator employing email to send a residue of the message, along with one, only, of the two factors and a notification that the removed portion is in said store, via an external Internet connection to said recipient;

said originator providing a second external network connection and employing said second network connection to send another, only, of the two factors to said recipient separately from the one factor;

said recipient receiving said one of the two factors and said notification by said email and said recipient receiving said another of the two factors, by said second external network, separately from said email;

said recipient accessing said externally accessible store; and said recipient providing a third network connection and employing said third network connection to provide said externally accessible store with the two factor authentication comprising said reference code and said authentication code for said externally accessible store to grant access to the removed portion.

19. A system for secure electronic communication of an email message with a security sensitive portion from an originator to a recipient, said system comprising:

a message splitter for removing at least a security sensitive portion of the message;

a removed portion sender for sending the removed portion to an externally accessible store via a first network connection, said externally accessible store being operative to grant access to said removed portion upon presentation of a two factor authentication, the two factors comprising an authentication code and a reference code;

an email message sender for sending one, only of the two factors together with a residue of the message, with notification that said removed portion is in said store, via an external Internet connection to said recipient;

a sender for sending another, only, of the two factors to said recipient, separately from the one factor, via a second, external network connection;

accessing means operable by said recipient for accessing said externally accessible store; and a third network connection operable by said recipient for providing said externally accessible store with said two factor authentication comprising said reference code and said authentication code for said externally accessible store to grant external access to said removed portion.

20. A method of originating secure electronic communication of an email message from an originator to a recipient, for use in the method of claim 1, said method comprising the steps of:

said originator removing a security sensitive portion of the message;

said originator employing a first network connection to send the removed portion to an externally accessible store, said externally accessible store being operative to grant access to said stored removed portion upon presentation of a two factor authentication, the two factors comprising an authentication code and a reference code;

said originator employing email to send the residue of the message, along with one, only, of the two factors and notification that said removed portion is in said store, via an external Internet connection to said recipient; and said originator employing a second external network connection to send another, only, of the two factors to said recipient separately from the one factor.

21. A system for originating secure electronic communication of an email message from an originator to a recipient, for use in the system of claim 13, said system comprising:

a message splitter operative to remove at least a security sensitive portion of the message;

a removed portion sender for sending the removed portion via a first network connection to an externally accessible store, said externally accessible store being operative to grant access to said stored removed portion upon presentation of a two factor authentication, the two factors comprising an authentication code and a reference code;

an email message sender for sending the residue of the message along with one, only, of the two factors and notification that said removed portion is in said store, via an external Internet connection to said recipient; and a sender for sending another, only, of the two factors to said recipient via a second, external network connection.

22. A method, according to claim 1, wherein said one factor comprises the authentication code and said another factor comprises the reference code.

\* \* \* \* \*